United States Patent
Hori et al.

(10) Patent No.: US 7,606,569 B2
(45) Date of Patent: Oct. 20, 2009

(54) WIRELESS TERMINAL FOR SELECTING OPTIMAL BASE STATION FROM AMONG PLURAL BASE STATIONS

(75) Inventors: Yosuke Hori, Fukuoka (JP); Hiroya Kuwahara, Fukuoka (JP); Kazuyuki Naka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 11/331,057

(22) Filed: Jan. 13, 2006

(65) Prior Publication Data

US 2007/0070938 A1 Mar. 29, 2007

(30) Foreign Application Priority Data

Sep. 27, 2005 (JP) ............................. 2005-280702

(51) Int. Cl.
*H04W 36/00* (2006.01)
(52) U.S. Cl. ...................... 455/436; 455/437; 455/438; 455/439; 455/442; 370/328; 370/331
(58) Field of Classification Search ................. 455/436, 455/437, 438, 439, 442; 370/328, 331
See application file for complete search history.

(56) References Cited

U.S. PATENT DOCUMENTS

| 5,471,671 | A | * | 11/1995 | Wang et al. ............... 455/226.2 |
| 6,167,119 | A | * | 12/2000 | Bartholomew et al. ... 379/88.04 |
| 6,430,414 | B1 | * | 8/2002 | Sorokine et al. ............ 455/442 |
| 2003/0017837 | A1 | * | 1/2003 | Kalliojarvi ................... 455/522 |
| 2003/0050084 | A1 | * | 3/2003 | Damnjanovic et al. ...... 455/522 |
| 2004/0202131 | A1 | * | 10/2004 | An et al. ...................... 370/331 |
| 2006/0014539 | A1 | * | 1/2006 | Oh .............................. 455/436 |
| 2007/0127651 | A1 | * | 6/2007 | Luft et al. .............. 379/142.01 |

FOREIGN PATENT DOCUMENTS

| JP | 09-023471 | 1/1997 |
| JP | 09-224281 | 8/1997 |

* cited by examiner

*Primary Examiner*—Joseph H Feild
*Assistant Examiner*—Huy D Nguyen
(74) *Attorney, Agent, or Firm*—Hanify & King, P.C.

(57) ABSTRACT

A wireless communication terminal includes: a base station list that stores information on a plurality of base stations, the information indicating whether each of the base stations accepts a call request from the wireless terminal; a selecting unit that selects one of the base stations that accepts the call request based on the information stored in the base station list; and a calling unit that transmits a call request to the base station selected by the selecting unit.

2 Claims, 17 Drawing Sheets

WIRELESS TERMINAL FOR SELECTING OPTIMAL BASE STATION FROM AMONG PLURAL BASE STATIONS

This application is based upon and claims the benefit of priority from the prior Japanese Patent Application No. 2005-280702, filed on Sep. 27, 2005, the entire contents of which are incorporated herein by reference.

BACKGROUND OF THE INVENTION

1. Field of the Invention

The invention relates to a technology for a wireless communication terminal, such as a cell phone, to select one of the base stations before actually making a call.

2. Description of the Related Art

Conventionally, base stations and wireless controllers in a mobile wireless network transmit various information on systems and cells as annunciation information to a wireless terminal via a downlink common channel. On the other hand, the wireless terminal receives radio waves emitted from base stations, measures the receiving intensities, and detects a receiving intensity equal to or more than a threshold. Then, the wireless terminal selects an appropriate base station that can be called and connected thereto in the range of the location of the wireless terminal as a destination base station based on regulation information contained in the annunciation information and the detection results of the base station from which receiving at a receiving intensity equal to or more than the threshold is possible, and calls the base station.

On the other hand, when the base station and the wireless controller receive a call request transmitted from the wireless terminal, they secure a necessary resource and perform control to connect a core network and the wireless terminal. Then, the base station and the wireless controller notify the wireless terminal of a connection response, whereby establishing a calling connection.

The mobile communications technique described below is generally known. In a mobile communications system including a control station that performs control to exchange mobile communications, a plurality of wireless base stations connected to the control station, and a plurality of mobile stations that make communications via the wireless base stations within wireless zones of the respective wireless base stations, a downlink control channel signal from each wireless base station to the mobile station is provided with a congestion control signal frame having an annunciation signal for performing congestion control of overlapping wireless zones, and the mobile station determines a wireless zone of the wireless base station to be captured based on the annunciation signal (see, for example, Japanese Patent Application Laid-Open No. H09-23471).

The cell phone unit described below is generally known. In the cell phone unit to be used as a mobile station of a mobile communications system in which a service area is divided into a plurality of wireless zones corresponding to base stations partially overlapping each other, control channels exclusively used for communications connection control without interference with each other are assigned to the zones in addition to channels for communications as wireless channels between base stations and the mobile station for each wireless zone, and a control channel is selected when calling, called, and registering positions, the cell phone receives while successively switching the control channels, regards a base station received at a maximum level as an optimal destination base station by comparing intensities of the receiving levels, controls connection, and when the connection control is failed between the cell phone unit and the base station received at the maximum level, performs connection control by successively switching to base stations in descending order of receiving levels (see, for example, Japanese Patent Application Laid-Open No. H09-224281).

However, in the conventional connection methods, when congestion or failure occurs on the mobile wireless network side including the wireless controller, a resource necessary for the calling connection cannot be secured, so that the calling connection cannot be made. When no response is made from the mobile wireless network side to the wireless terminal, the wireless terminal transmits a call request to the base station again after a predetermined time elapses. Therefore, if the mobile wireless network side does not return a response to the wireless terminal due to a temporary resource shortage, it takes time to complete the calling.

Furthermore, it takes time for the wireless terminal to judge calling connection impossibility because it has no unit that makes the wireless terminal recognize the impossibility of calling due to the status in the mobile wireless network such as a temporary resource shortage. When a plurality of connectable base stations are present and cells of the base stations overlap each other, the resources of each station can be used. Namely, a plurality of resources are available for calling connection between the wireless terminal and a base station. In such a situation, first calling connection is made to a certain base station, and after a failure of the calling connection is detected, re-connection processing to another base station is performed, so that it takes time to complete the calling connection.

SUMMARY OF THE INVENTION

It is an object of the present invention to at least solve the problems in the conventional technology.

A wireless communication terminal according to an aspect of the present invention includes: a base station list that stores information on a plurality of base stations, the information indicating whether each of the base stations accepts a call request from the wireless terminal; a selecting unit that selects one of the base stations that accepts the call request based on the information stored in the base station list; and a calling unit that transmits a call request to the base station selected by the selecting unit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention are explained in detail with reference to the accompanying drawings.

Figure 1:
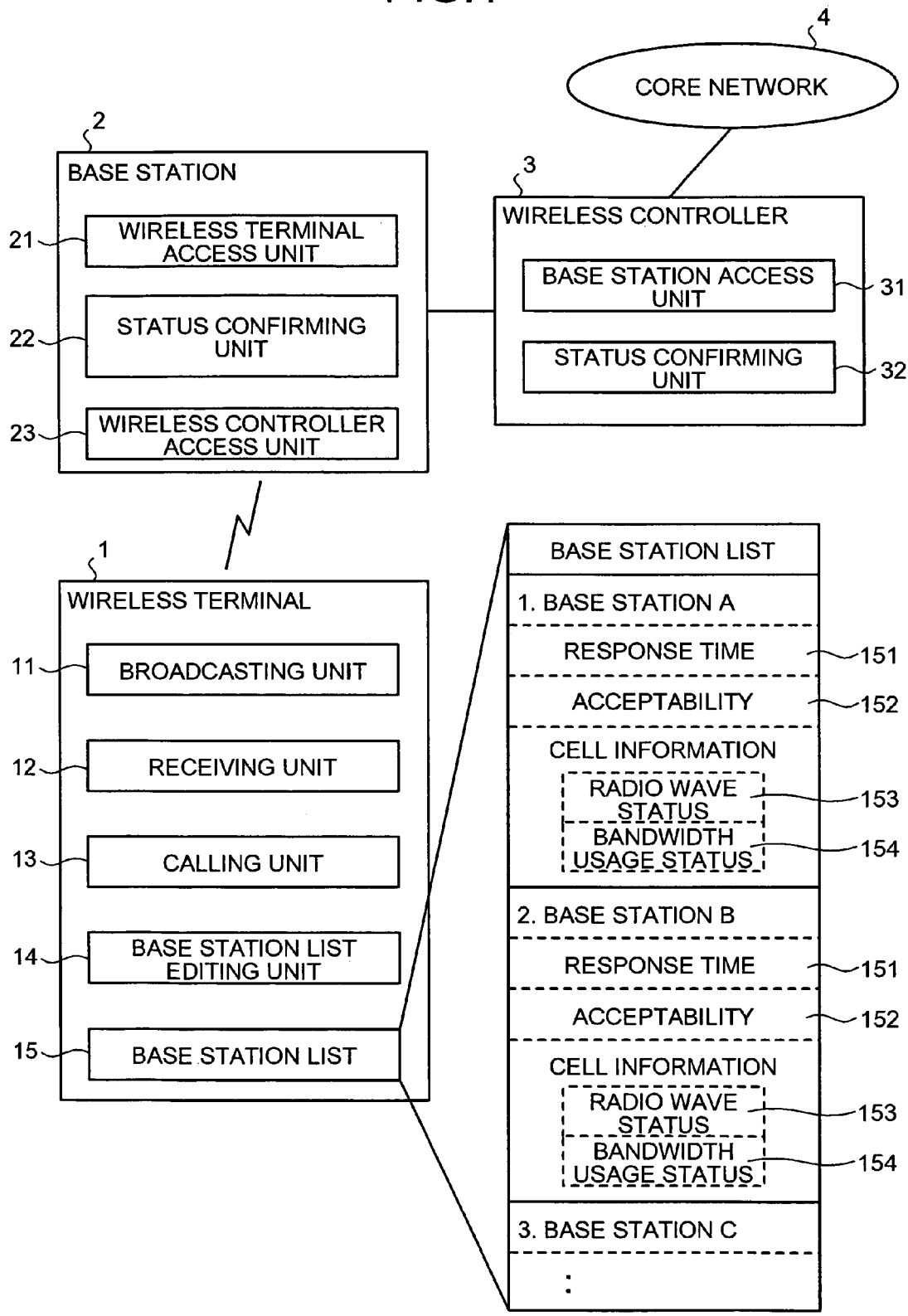
FIG. 1 is a block diagram of a wireless communication system according to a first embodiment of the present invention.

FIG. 1 is a block diagram of a wireless communication system according to a first embodiment of the present invention. The reference numeral 1 denotes a mobile wireless terminal such as a cell phone, the reference numeral 2 denotes a base station that is wirelessly connected to the wireless terminal 1, and the reference numeral 3 denotes a wireless controller that controls connection and handover of the wireless line. The wireless controller 3 is connected to the Internet, intranet, and other networks via a core network 4 and a gateway (not shown).

The wireless terminal 1 includes a broadcasting unit 11, a receiving unit 12, a calling unit 13, a base station list editing unit 14, and a base station list 15. The broadcasting unit 11 performs broadcasting to base stations to collect information on the base stations when the wireless terminal 1 makes a call. The receiving unit 12 receives a signal transmitted from the base station 2. The calling unit 13 makes a call to the base station 2. The base station list editing unit 14 edits the base station list 15.

The base station list 15 is a list of information on each of base stations 2 near the wireless terminal 1, or more exactly, base stations 2 within the coverage area of which the wireless terminal 1 is located (hereinafter, "nearby base stations"). Response time information 151 indicates a response time to be taken for communications between the wireless terminal 1 and the base station 2. Acceptability information 152 indicates whether the base station 2 can accept (process) a call request from the wireless terminal 1. Cell information includes radio wave status information 153 indicating a state of a radio wave in communications between the wireless terminal 1 and the base station 2, and bandwidth usage status information 154 indicating a usage status of bandwidth in the communications between the wireless terminal 1 and the base station 2.

The base station 2 includes a wireless terminal access unit 21, a status confirming unit 22, and a wireless controller access unit 23. The wireless terminal access unit 21 transmits and receives signals to and from the wireless terminal 1. The status confirming unit 22 confirms whether the cell to which the base station 2 belongs can accept (process) a call request from the wireless terminal 1. The wireless controller access unit 23 transmits and receives signals to and from the wireless controller 3.

The wireless controller 3 includes a base station access unit 31 and a status confirming unit 32. The base station access unit 31 transmits and receives signals to and from the base station 2. The status confirming unit 32 confirms whether the wireless controller 3 can accept (process) a call request from the wireless terminal 1.

Figure 2:
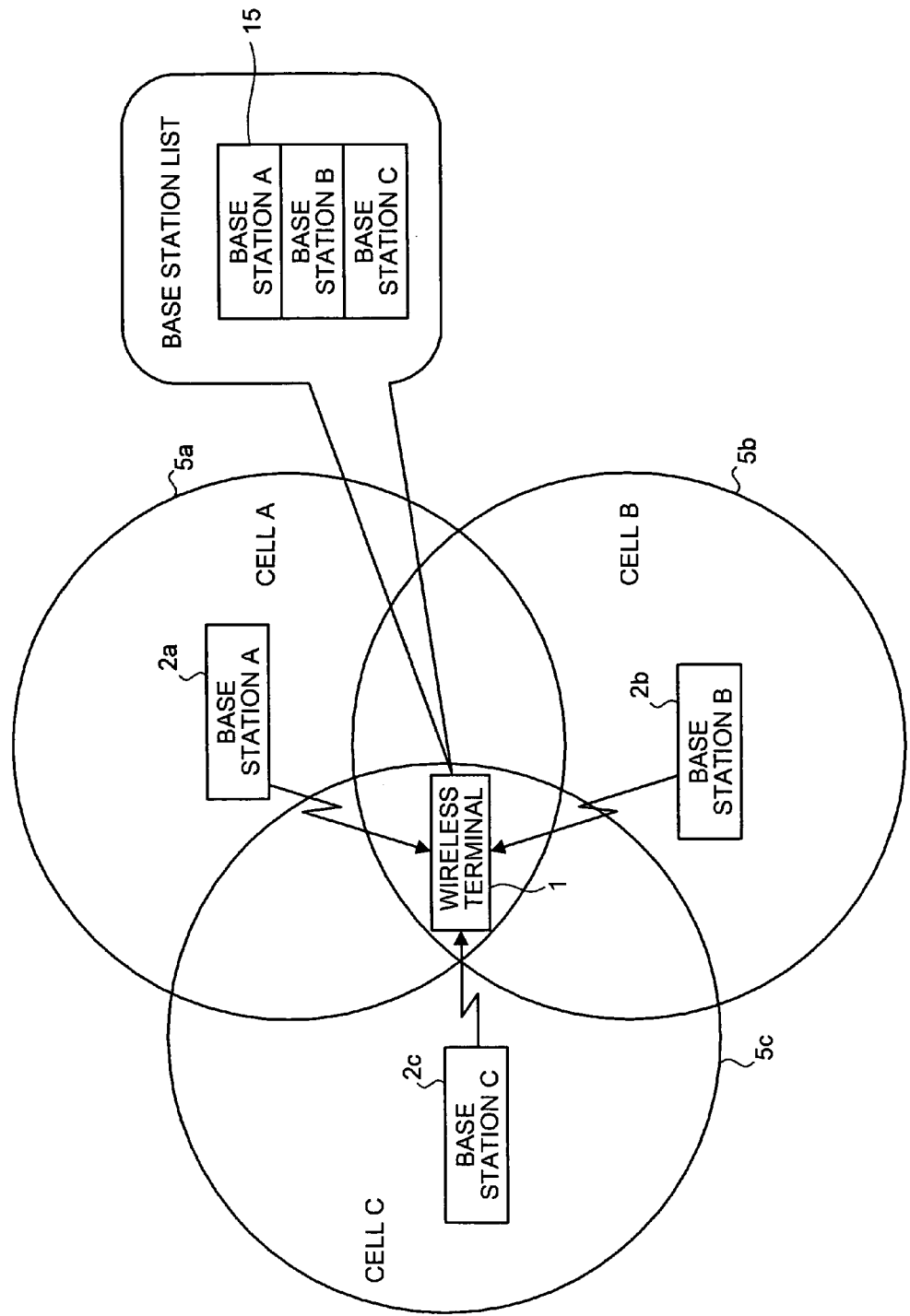
FIG. 2 is a diagram for explaining the positions of a wireless terminal and base stations shown in FIG. 1.

FIG. 2 is a diagram for explaining the positions of the wireless terminal 1 and the base stations 2. The wireless terminal 1 is located at the overlapping area of a cell A5a of a base station A2a, a cell B5b of a base station B2b, and a cell C5c of a base station C2c. In other words, the wireless terminal 1 is at a location where a radio wave can reach from any one of the base stations. The wireless terminal 1 identifies each of the base stations based on a base station identifier (BS-ID) notified from the base stations through a control channel, and stores information on the base stations in the base station list 15.

Figure 3:
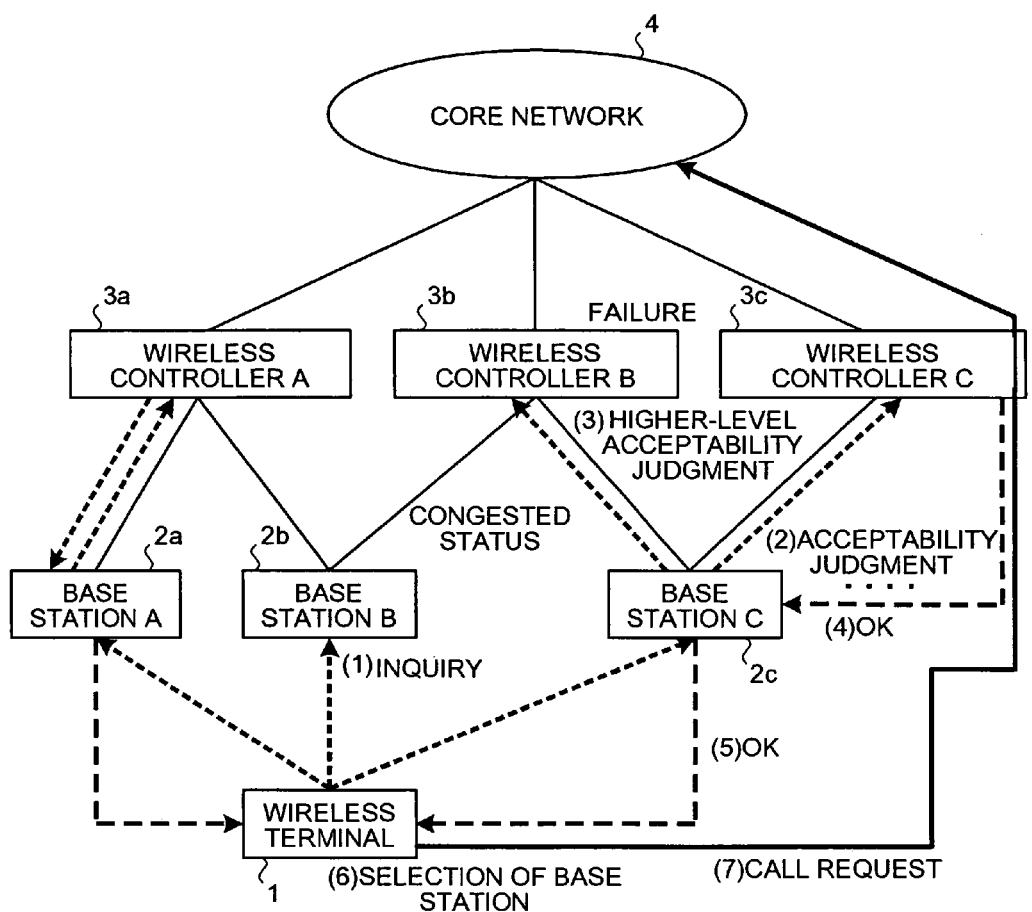
FIG. 3 is a diagram for explaining the outline of a base station selection according to the first embodiment.

FIG. 3 is a diagram for explaining the outline of a base station selection according to the first embodiment of the present invention. A wireless controller A3a is a higher-level device of the base station A2a and the base station B2b. A wireless controller B3b is a higher-level device of the base station B2b and the base station C2c. A wireless controller C3c is a higher-level device of the base station C2c.

The wireless terminal 1 broadcasts an inquiry to all of the nearby base stations, that is, the base station A2a, the base station B2b, and the base station C2c ((1) of FIG. 3). The base station A2a judges whether the cell A5a can accept (process) a call request from the wireless terminal 1 ((2) of FIG. 3). Similarly, the base station B2b judges whether the cell B5b can accept (process) the call request, and the base station C2c judges whether the cell C5c can accept (process) the call request.

In the first embodiment, it is assumed that the base station B2b is in a congested state and the wireless controller B3b is in a failure state. In this case, the base station A2a sends an OK message to the wireless controller A3a that judges whether it can accept the call request. Similarly, the base station C2c sends an OK message to the wireless controller B3b and the wireless controller C3c that judge whether they can accept the call request, respectively ((3) of FIG. 3). The base station B2b in a congested state sends an OK message neither the wireless controller A3a nor the wireless controller B3b.

The wireless controller A3a and the wireless controller C3c send an OK message to the base station A2a and the base station C2c, respectively ((4) of FIG. 3). The wireless controller B3b in a failure state does not send an OK message to the base station B2b and the base station C2c.

The base station A2a and the base station C2c receive OK messages from the wireless controller A3a and the wireless controller C3c, and forward the OK messages to the wireless terminal 1, respectively ((5) of FIG. 3).

The wireless terminal 1 selects one of the nearby base stations that is the fastest to respond to the inquiry. In the first embodiment, it is assumed that the wireless terminal 1 receives the OK message from the base station C2c earlier than that from the base station A2a. In this case, the wireless terminal 1 selects the base station C2c ((6) of FIG. 3), and sends a call request to the selected base station C2c ((7) of FIG. 3) to be connected to the core network 4 via the base station C2c and the wireless controller C3c.

Figure 4:
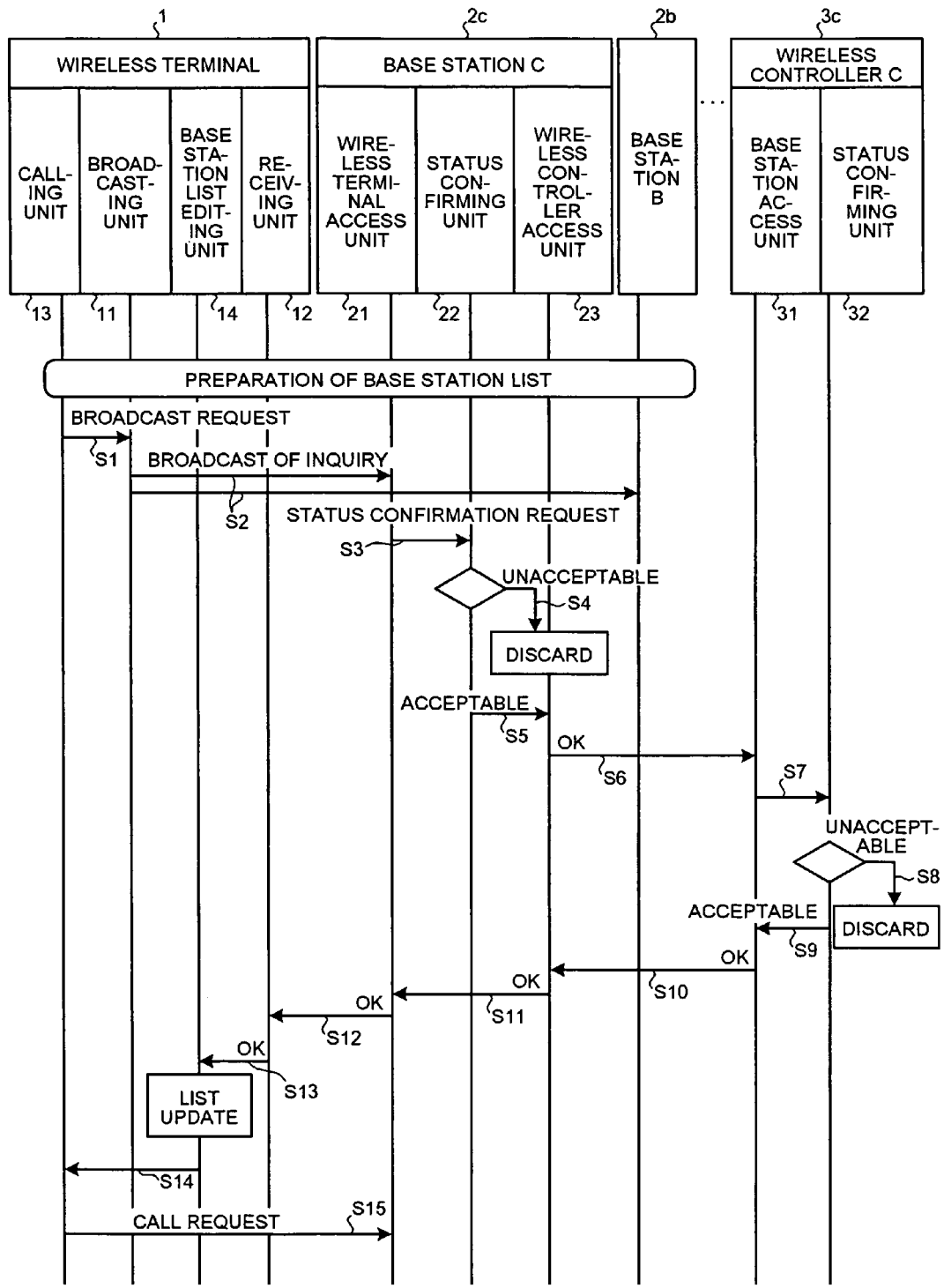
FIG. 4 is a timing chart the base station selection according to the first embodiment.

FIG. 4 is a timing chart of the base station selection according to the first embodiment of the present invention. When making a call, the calling unit 13 of the wireless terminal 1 requests the broadcasting unit 11 to broadcast the inquiry to the base stations (Step S1). The broadcasting unit 11 refers to the base station list 15, and broadcasts the inquiry to all of the base stations listed in the base station list 15, that is, the nearby base stations such as the base station A2a, the base station B2b, and the base station C2c (Step S2).

The base station A2a/B2b/C2c receives the inquiry by the wireless terminal access units 21 that requests the status confirming unit 22 to confirm the status of the base station A2a/B2b/C2c (Step S3). The status confirming unit 22 judges whether the cell A5a/B5b/C5c can accept a call request. When the cell A5a/B5b/C5c cannot accept the call request, the inquiry is discarded (Step S4). In the example shown in FIG. 3, the inquiry to the base station B2b is discarded because the base station B2b is in a congested state and is unable to process the call request.

On the other hand, the status confirming unit 22 of the base station A2a/C2c outputs an OK message to the wireless controller access unit 23 because the cell A5a/C5c can accept the call request (Step S5). The wireless controller access unit 23 sends the OK message to the wireless controller A3a/C3c (Step S6).

The wireless controller A3a/C3c receives the OK message by the base station access unit 31 that requests the status confirming unit 32 to confirm the status of the wireless controller A3a/C3c (Step S7). The status confirming unit 32 judges whether the wireless controller A3a/C3c can accept a call request. When the wireless controller A3a/C3c cannot accept the call request, the OK message is discarded (Step S8).

On the other hand, when the wireless controller A3a/C3c can accept the call request, the status confirming unit 32 outputs an OK message to the base station access unit 31 (Step S9). The base station access unit 31 sends the OK message to the base station A2a/C2c (Step S10).

The base station A2a/C2c receives the OK message by the wireless controller access unit 23 that outputs the OK message to the wireless terminal access unit 21 (Step S11). The wireless terminal access unit 21 sends the OK message to the wireless terminal 1 (Step S12).

The wireless terminal 1 receives the OK message by the receiving unit 12 that notifies the fact to the base station list editing unit 14 (Step S13). The base station list editing unit 14 updates acceptability information 152 of the base station A2a/C2c in the base station list 15 to "acceptable". The base station list editing unit 14 also updates the acceptability information 152 of the base station B2b to "unacceptable".

Along with updating of the base station list 15, the base station list editing unit 14 selects the base station C2c that is the fastest to respond to the inquiry, and notifies the calling unit 13 of information on the selected base station C2c, such as a communication speed (Step S14). The calling unit 13 transmits a call request to the base station C2c (Step S15), and performs wireless communication with the base station C2c.

According to the first embodiment, a call request is sent to a base station that can secure sufficient resource to perform wireless communication, thereby preventing failure and shortening the time to establish wireless connection. In addition, the load is evenly distributed among the wireless controllers and base stations, thereby preventing congestion and providing stable service for users.

Figure 5:
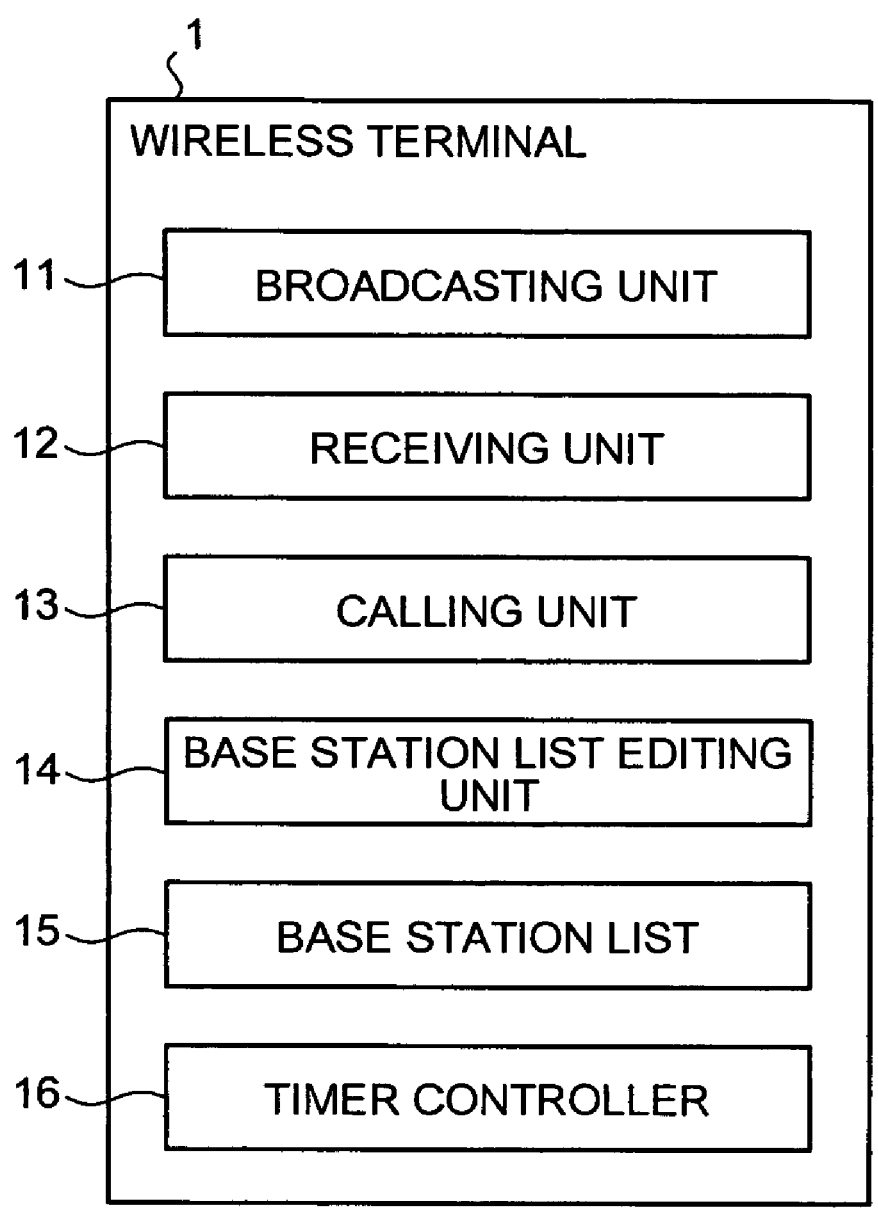
FIG. 5 is a block diagram of a wireless terminal in a wireless communication system according to a second embodiment of the present invention.

FIG. 5 is a block diagram of a wireless terminal in a wireless communication system according to a second embodiment of the present invention. According to the second embodiment, the wireless terminal 1 further includes a timer controller 16 to measure the waiting time for the OK message, in other words, the time period from the broadcast of the inquiry to the base stations and the reception of OK responses from the base stations.

Figure 6:
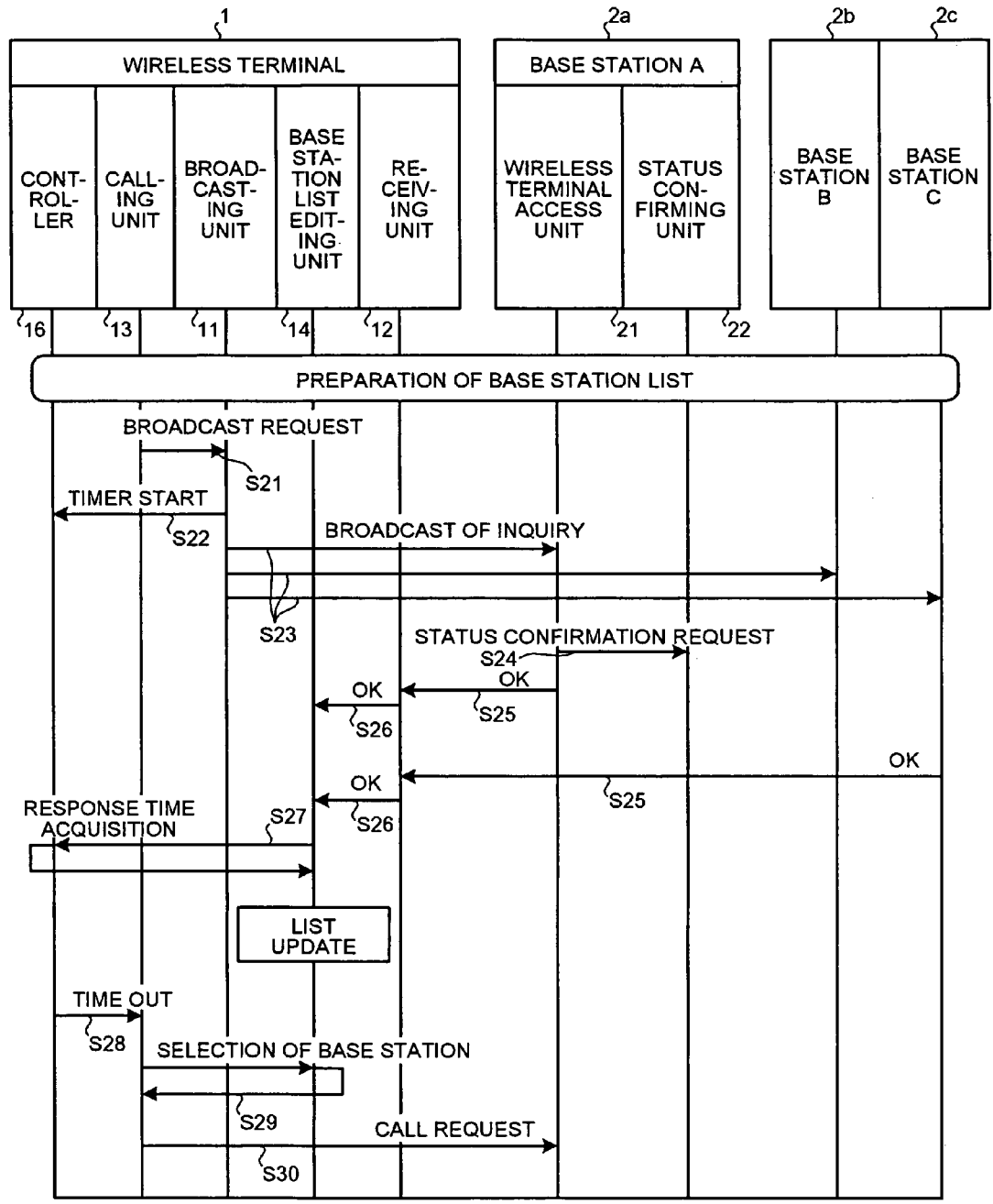
FIG. 6 is a timing chart of the base station selection according to the second embodiment.

FIG. 6 is a timing chart of a base station selection according to the second embodiment of the present invention. When making a call, the calling unit 13 of the wireless terminal 1 requests the broadcasting unit 11 to broadcast the inquiry to the base stations (Step S21).

The broadcasting unit 11 requests the timer controller 16 to start a timer (Step S22). The timer controller 16 sets a predetermined time to the timer, for example, two seconds.

Subsequently, the broadcasting unit 11 refers to the base station list 15, and broadcasts the inquiry to nearby base stations, that is, the base station A2a, the base station B2b, and the base station C2c (Step S23).

The base station A2a/B2b/C2c receives the inquiry by the wireless terminal access unit 21 that requests the status confirming unit 22 to confirm the status of the base station A2a/B2b/C2c (Step S24). The status confirming unit 22 judges whether the cell A5a/B5b/C5c can accept a call request. Subsequent operations are the same as Step S4 through Step S11 of the first embodiment, so that explanation thereof is omitted, and explanation is continued from Step S25.

After the same process as Step S4 to Step S11 of the first embodiment, the receiving unit 12 of the wireless terminal 1 receives OK messages from the base station A2a and the base station C2c, respectively (Step S25). The receiving unit 12 notifies the fact to the base station list editing unit 14 (Step S26). The base station list editing unit 14 acquires response times of the base station A2a and the base station C2c from the timer controller 16 (Step S27), and updates response time information 151 and radio wave status information 153 of the base station A2a and the base station C2c in the base station list 15.

When two seconds have elapsed, the timer controller 16 notifies time out to the calling unit 13 (Step S28). The calling unit 13 requests the base station list editing unit 14 to select one of the base stations. The base station list editing unit 14 refers to the base station list 15, selects a base station in a good radio wave status or a base station with a short response time, and notifies the calling unit 13 of the selected base station (Step S29). The calling unit 13 sends a call request to the selected base station (Step S30), and performs wireless communication with the selected base station.

According to the second embodiment, the same effect as that of the first embodiment is obtained. In addition, a base station in a good radio wave status or a base station with a short response time is selected, thereby further shortening the time to establish wireless connection.

Figure 7:
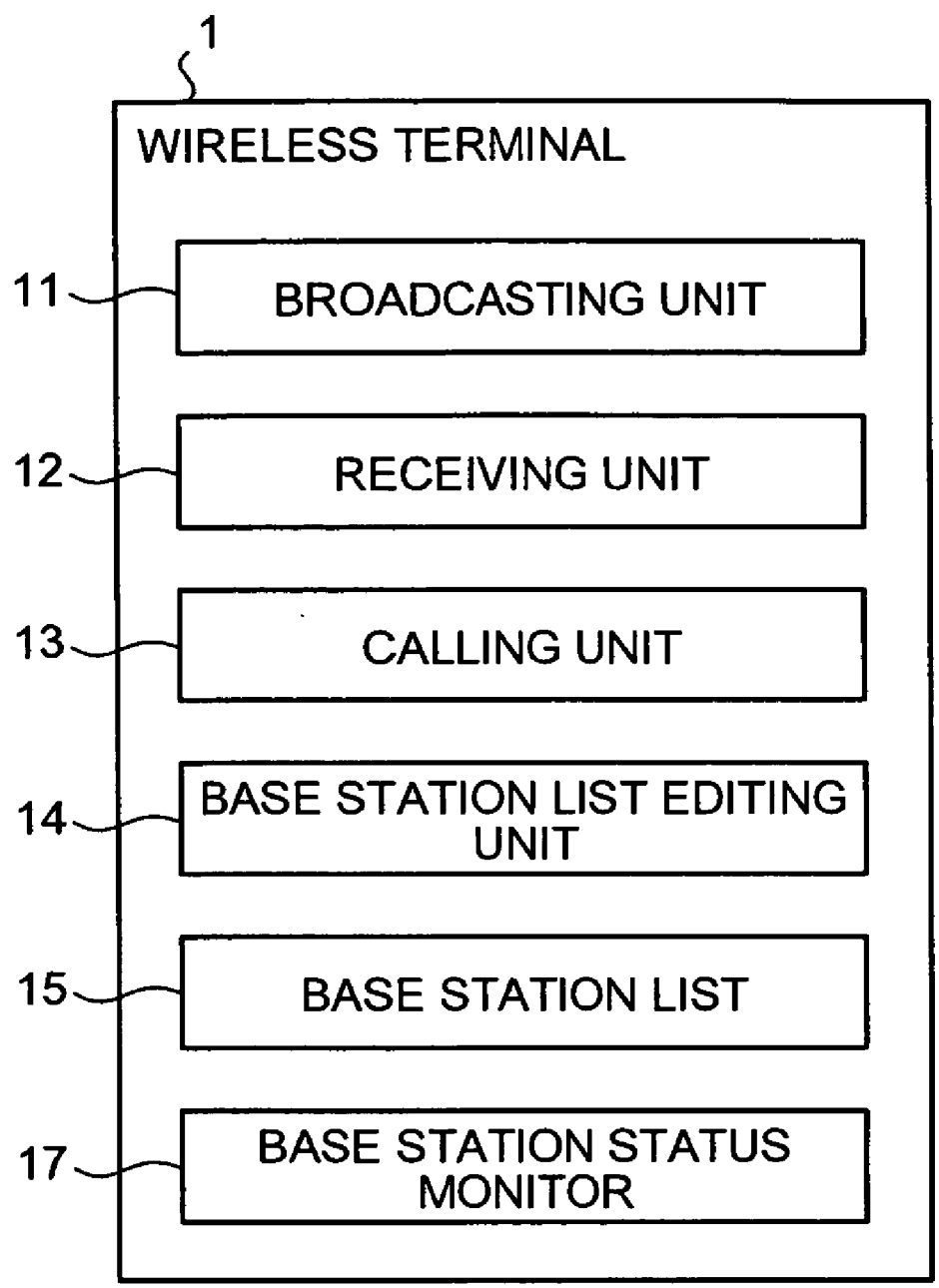
FIG. 7 is a block diagram of a wireless terminal in a wireless communication system according to a third embodiment of the present invention.

FIG. 7 is a block diagram of a wireless terminal in a wireless communication system according to a third embodiment of the present invention. According to the third embodiment, the wireless terminal 1 further includes a base station status monitor 17 that periodically broadcasts a status confirmation request to the nearby base stations, and receives responses to keep the base station list 15 up-to-date.

Figure 8:
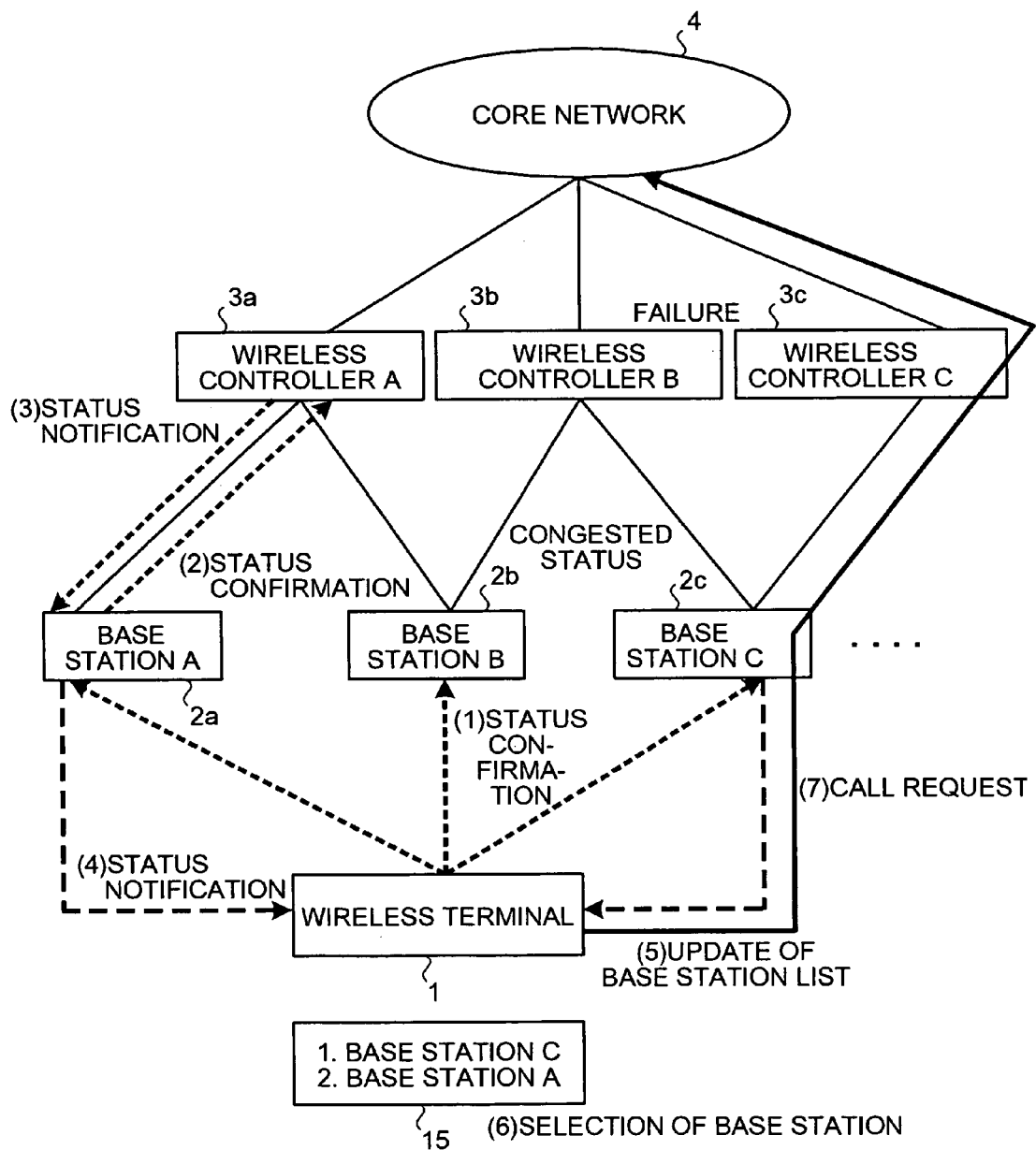
FIG. 8 is a diagram for explaining the outline of a base station selection according to the third embodiment.

FIG. 8 is a diagram for explaining the outline of a base station selection according to the third embodiment of the present invention. The wireless terminal 1 periodically transmits a status confirmation request the nearby base stations to confirm their statuses ((1) of FIG. 8). The base station A2a, the base station B2b, and the base station C2c judge whether they can accept a call request by referring to their failure statuses, congestion statuses, and line utilizations.

The base station A2a/C2c, which can accept the call request, forwards the status confirmation request to the wireless controller A3a/C3c ((2) of FIG. 8). The wireless controller A3a/C3c judges whether they can accept a call request by referring to its failure status, congestion status, and line utilization. When the wireless controller A3a/C3c can accept the call request, the wireless controller A3a/C3c notifies the base station A2a/C2c of information such as the calling connection acceptable status, the number of wireless terminals 1 in communication therewith, available capacity of the line, and available service list ((3) of FIG. 8).

The base station A2a/C2c sends a status confirmation response to the wireless terminal 1 ((4) of FIG. 8). The status confirmation response includes information on the acceptability, the radio wave status of the cell, available bandwidth, the number of wireless terminals in communication therewith, available capacity of the line, and available service list.

The wireless terminal 1 updates the base station list 15 based on the status confirmation response ((5) of FIG. 8). The wireless terminal 1 selects, based on the base station list 15 updated to the latest state, the optimal base station for a service to be utilized ((6) of FIG. 8). The calling unit 13 transmits a call request to the optimal base station ((7) of FIG. 8).

Figure 9:
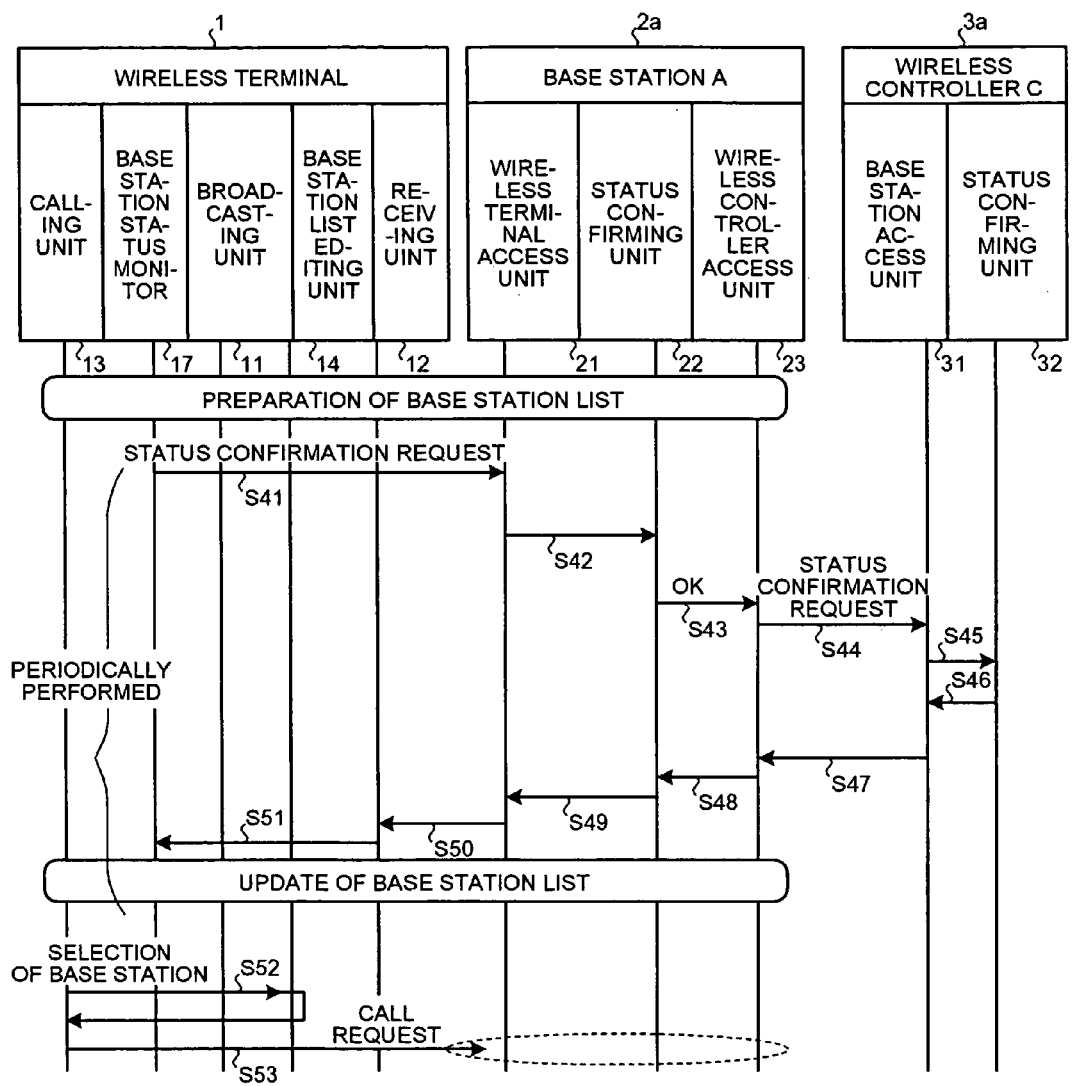
FIG. 9 is a timing chart of the base station selection according to the third embodiment.

FIG. 9 is a timing chart of the base station selection according to the third embodiment of the present invention. The wireless terminal 1 periodically transmits a status confirmation request to the nearby base stations based on the base station list 15 (Step S41).

The base station A2a/B2b/C2c receives the status confirmation request by the wireless terminal access unit 21 that requests the status confirming unit 22 to confirm the status of the base station A2a/B2b/C2c (Step S42). The status confirming unit 22 judges whether the base station A2a/B2b/C2c can accept a call request based on a failure status, a congestion status, and line utilization of the base station A2a/B2b/C2c.

The status confirming unit 22 of the base station A2a/C2c notifies the wireless controller access unit 23 thereof that the base station A2a/C2c can accept the call request (Step S43). The wireless controller access unit 23 of the base station A2a requests the wireless controller A3a to judge whether it can accept a call request. Similarly, the wireless controller access unit 23 of the base station C2c requests the wireless controller B3b and the wireless controller C3c to judge whether they can accept a call request (Step S44).

The wireless controller A3a/B3b/C3c receives the request by the base station access unit 31 that requests the status confirming unit 32 to confirm the status of the wireless controller A3a/B3b/C3c (Step S45). The status confirming unit 32 judges whether the wireless controller A3a/B3b/C3c can accept the call request based on a failure status, congestion status, and line utilization.

In this case, the status confirming unit 32 of the wireless controller A3a/C3c notifies the base station access unit 31 that the wireless controller A3a/C3c can accept the call request (Step S46). The base station access unit 31 of the wireless controller A3a/C3c sends a response to the base station A2a/C2c (Step S47). The base station A2a/C2c receives the response by the wireless controller access unit 23 that outputs the status confirming unit 22 of the response (Step S48).

The status confirming unit 22 of the wireless controller A3a/C3c notifies the wireless terminal access unit 21 of information indicating the acceptability, a radio wave status of the cell, an available bandwidth, the number of wireless terminals 1 in communication therewith, available capacity of the line, and available service list (Step S49). The wireless terminal access unit 21 notifies the wireless terminal 1 of these pieces of information as the status confirmation response (Step S50).

The wireless terminal 1 receives the response by the receiving unit 12 that outputs the response to the base station status monitor 17 (Step S51). The base station status monitor 17 updates acceptability information 152, radio wave status information 153, and bandwidth usage status information 154 of the base station A2a/C2c in the base station list 15. The base station status monitor 17 also selects, based on the base station list 15 updated to the latest state, the optimal base station for a service to be utilized.

When making a call, the calling unit 13 requests the base station list editing unit 14 to confirm a base station to be connected. The base station list editing unit 14 refers to the base station list 15, and notifies the calling unit 13 of the base station selected as the optimal base station (Step S52). The calling unit 13 transmits a call request to the selected base station (Step S53), and performs wireless communication with the selected base station.

According to the third embodiment, the same effect as in the first embodiment is obtained. In addition, the wireless terminal 1 does not need to broadcast the inquiry to the base stations when making a call as in the first embodiment, because the base station list 15 is always updated to the latest state and the optimal base station has been selected, thereby further shortening the time to establish wireless connection.

A configuration of the wireless terminal 1 according to a fourth embodiment of the present invention is the same as that of the first embodiment. However, the wireless terminal 1 according to the fourth embodiment is notified whether the base stations and the wireless controllers can accept a call request from the base stations and the wireless controllers.

Figure 10:
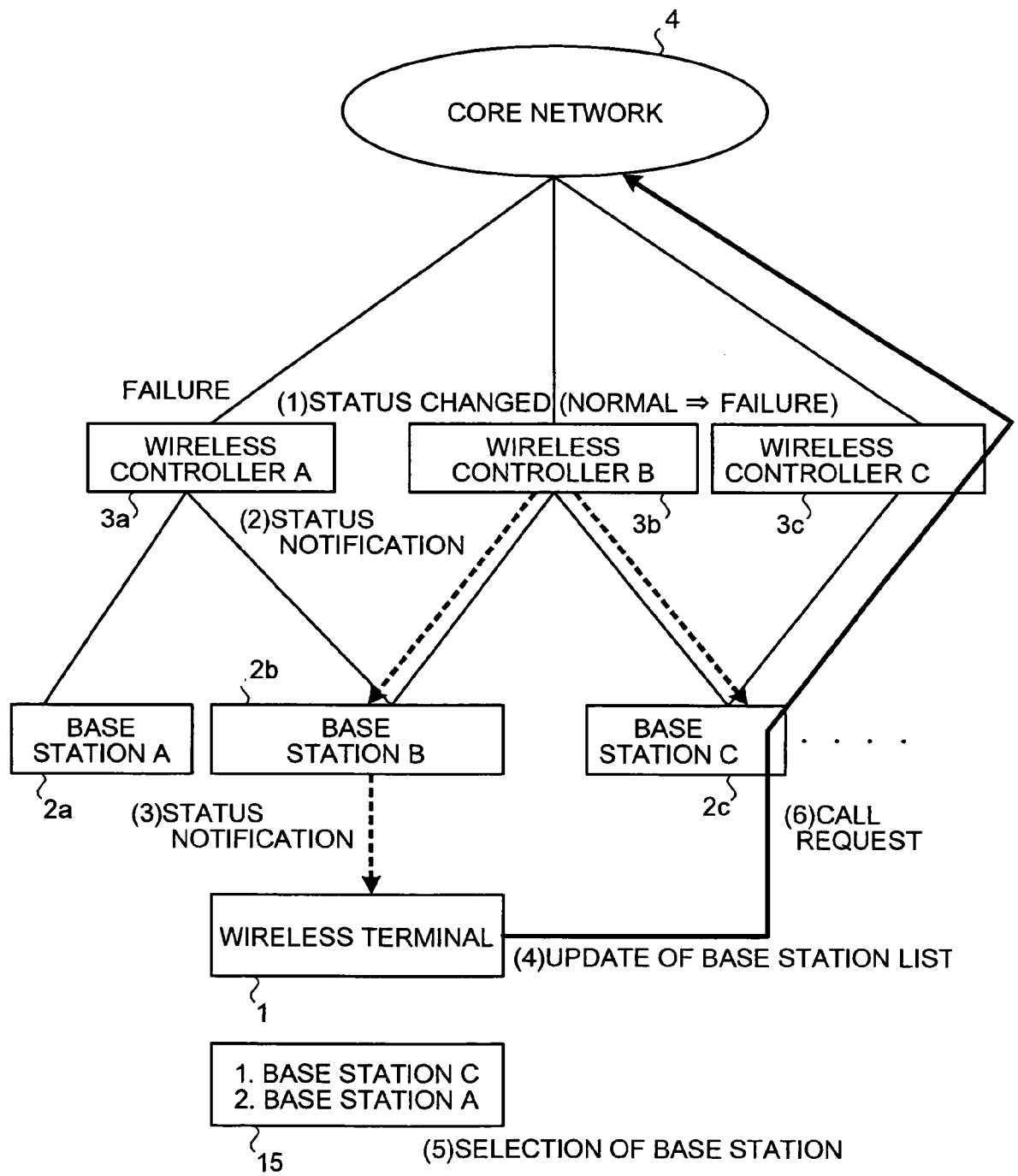
FIG. 10 is a diagram for explaining the outline of a base station selection according to a fourth embodiment of the present invention.

FIG. 10 is a diagram for explaining the outline of a base station selection according to the fourth embodiment of the present invention. The wireless controller B3b periodically monitors whether it can accept a call request from the wireless terminal 1 by the status confirming unit 32. When the wireless controller B3b becomes unable to accept a call request ((1) of FIG. 10), the wireless controller B3b notifies all subordinate base stations, that is, the base station B2b and the base station C2c of the status change by the base station access unit 31 ((2) of FIG. 10).

The same applies when the wireless controller B3b becomes able to accept a call request. In this case, the wireless controller B3b notifies, as well as the status change, the number of wireless terminals 1 in communication therewith, available capacity of the line, and available service list.

The base station B2b receives the notification of the status change by the wireless controller access unit 23 that outputs the notification to the status confirming unit 22. The status confirming unit 22 holds a list recording the statuses of the higher-level wireless controllers, and updates the list based on the notification.

Because all of the higher-level devices of the base station B2b, that is, the wireless controller A3a and the wireless controller B3b cannot accept any call request, the status confirming unit 22 of the base station B2b judges that it is necessary to notify the wireless terminal 1 of the status change, and notifies the wireless terminal 1 of the status change through the wireless terminal access unit 21 ((3) of FIG. 10). The same applies to the base station C2c, however, the base station C2c does not notify the status change of the wireless controller B3b to the wireless terminal 1 because one of the higher-level devices of the base station C2c, that is, the wireless controller C3c can accept the call request.

On the other hand, when the wireless controller B3b becomes able to accept the call request, the radio wave status of the subordinate cell, an available bandwidth, the number of wireless terminals 1 in communication therewith, available capacity of the line, and available service list are also notified along with the status change.

The wireless terminal 1 receives the notification from the base station B2b by the receiving unit 12, and updates the base station list 15 by the base station list editing unit 14 based on the notification ((4) of FIG. 10). Specifically, the acceptability information 152 of the base station B2b is updated to "unacceptable". The wireless terminal 1 selects the optimal base station for a service to be utilized based on the updated base station list 15 ((5) of FIG. 5). The calling unit 13 of the wireless terminal 1 transmits a call request to the selected base station ((6) of FIG. 10).

According to the fourth embodiment, the same effect as that of the first embodiment is obtained. In addition, the wireless terminal 1 does not need to broadcast the inquiry to the base stations when making a call as in the first embodiment, because the base station list 15 has already been updated based on the notification from the base station, thereby further shortening the time to establish wireless connection.

A configuration of the wireless terminal 1 according to a fifth embodiment of the present invention is the same as that of the first embodiment. However, the wireless terminal 1 refers to the acceptability information 152 in the base station list 15, and transmits the inquiry only to the base stations that can accept a call request.

Figure 11:
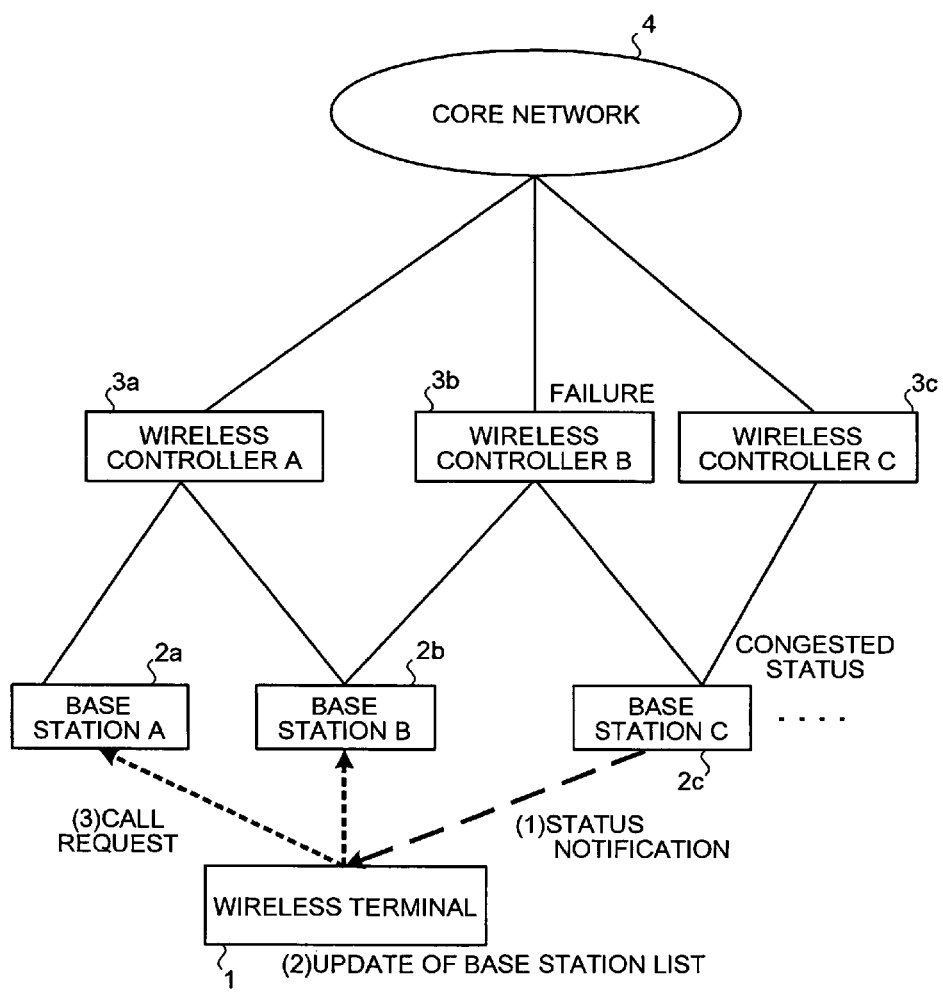
FIG. 11 a diagram for explaining the outline of a base station selection according to a fifth embodiment of the present invention.

FIG. 11 is a diagram for explaining the outline of a base station selection according to the fifth embodiment of the present invention. In the example shown in FIG. 11, it is assumed that the base station C2c is in a congested state and the wireless controller B3b is in a failure state, and the fact has been notified to the wireless terminal 1 from the base station C2c ((1) of FIG. 11).

The wireless terminal 1 updates the base station list 15 to the latest status based on the notification from the base station C2c ((2) of FIG. 11). When making a call, in response to an instruction from the calling unit 13, the broadcasting unit 11 of the wireless terminal 1 refers to the base station list 15 and broadcasts the inquiry to the base station A2a and the base station B2b ((3) of FIG. 11).

The inquiry is not transmitted to the base station C2c because the acceptability information 152 thereof stored in the base station list 15 is set to "unacceptable".

Figure 12:
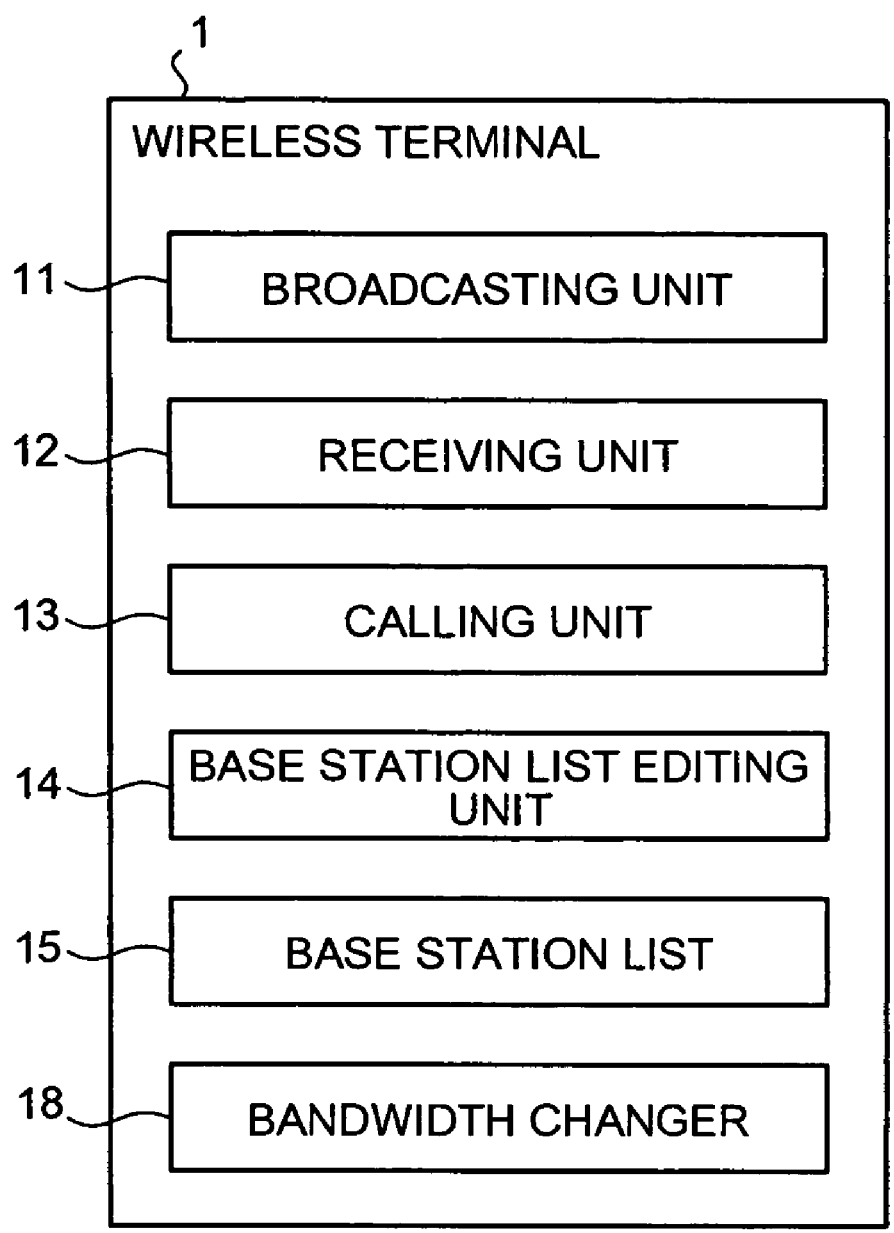
FIG. 12 is a block diagram of a wireless terminal in a wireless communication system according to a sixth embodiment of the present invention.

FIG. 12 is a block diagram of a wireless terminal in a wireless communication system according to a sixth embodiment of the present invention. The wireless terminal 1 according to the sixth embodiment further includes a bandwidth changer 18 that changes the bandwidth to be used by the wireless terminal 1.

Figure 13:
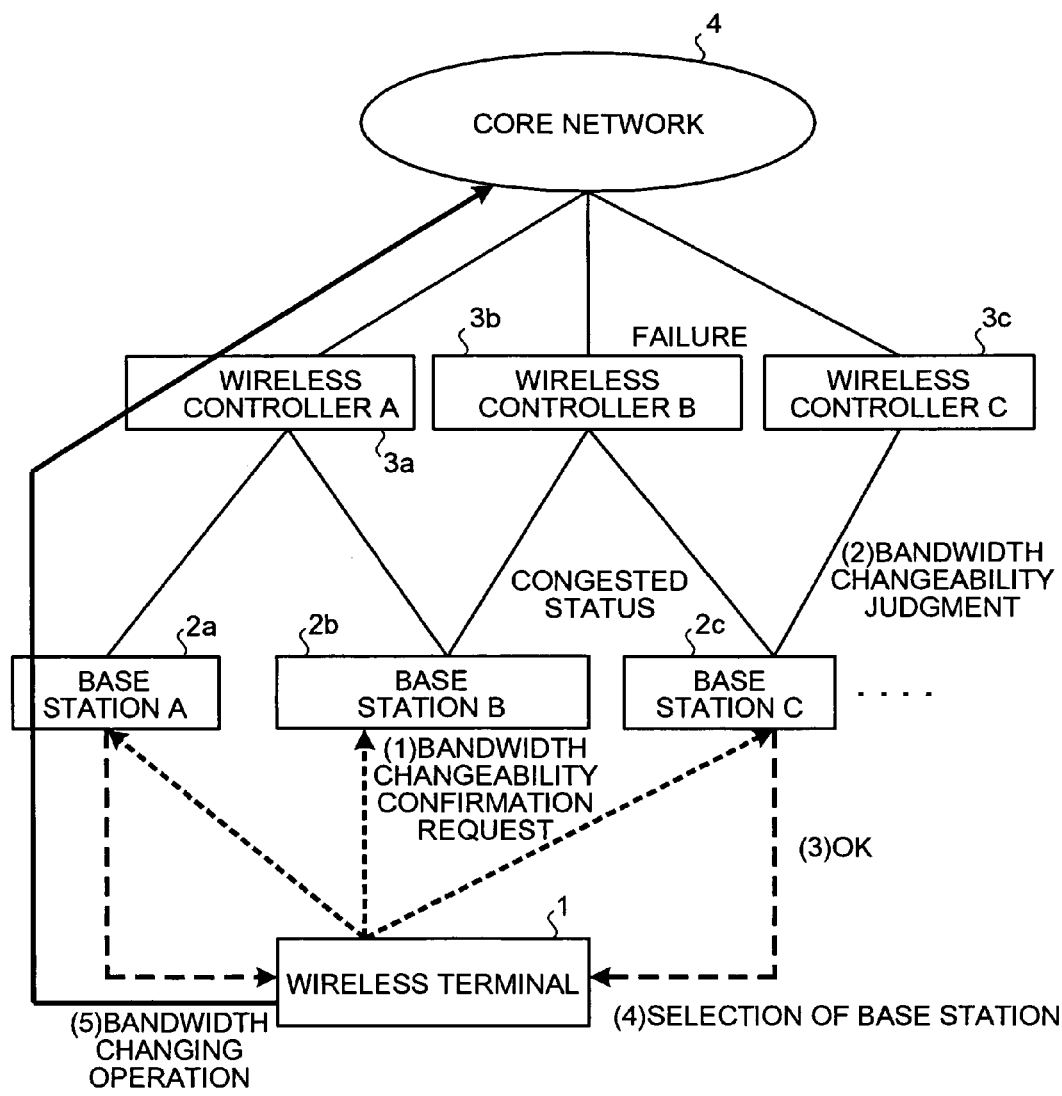
FIG. 13 is a diagram for explaining the outline of a bandwidth change according to the sixth embodiment.

FIG. 13 is a diagram for explaining the outline of a bandwidth change according to the sixth embodiment of the present invention. The wireless terminal 1 broadcasts a request for confirmation as to the changeability of the bandwidth to all of the nearby base stations, that is, the base station A2a, the base station B2b, and the base station C2c ((1) of FIG. 13).

The base station A2a/B2b/C2c judges whether they can change the bandwidth in their subordinate cells ((2) of FIG. 13). In the sixth embodiment, the base station B2b cannot change the bandwidth because it is in a congested state. The base station A2a and the base station C2c, which can change their bandwidths, send OK messages to the wireless terminal 1, respectively ((3) of FIG. 13).

The wireless terminal 1 selects one of the base stations that can change the bandwidth, for example, the base station A2a ((4) of FIG. 13). Then, the wireless terminal 1 changes the bandwidth used in the communication with the base station A2a ((5) of FIG. 13).

Figure 14:
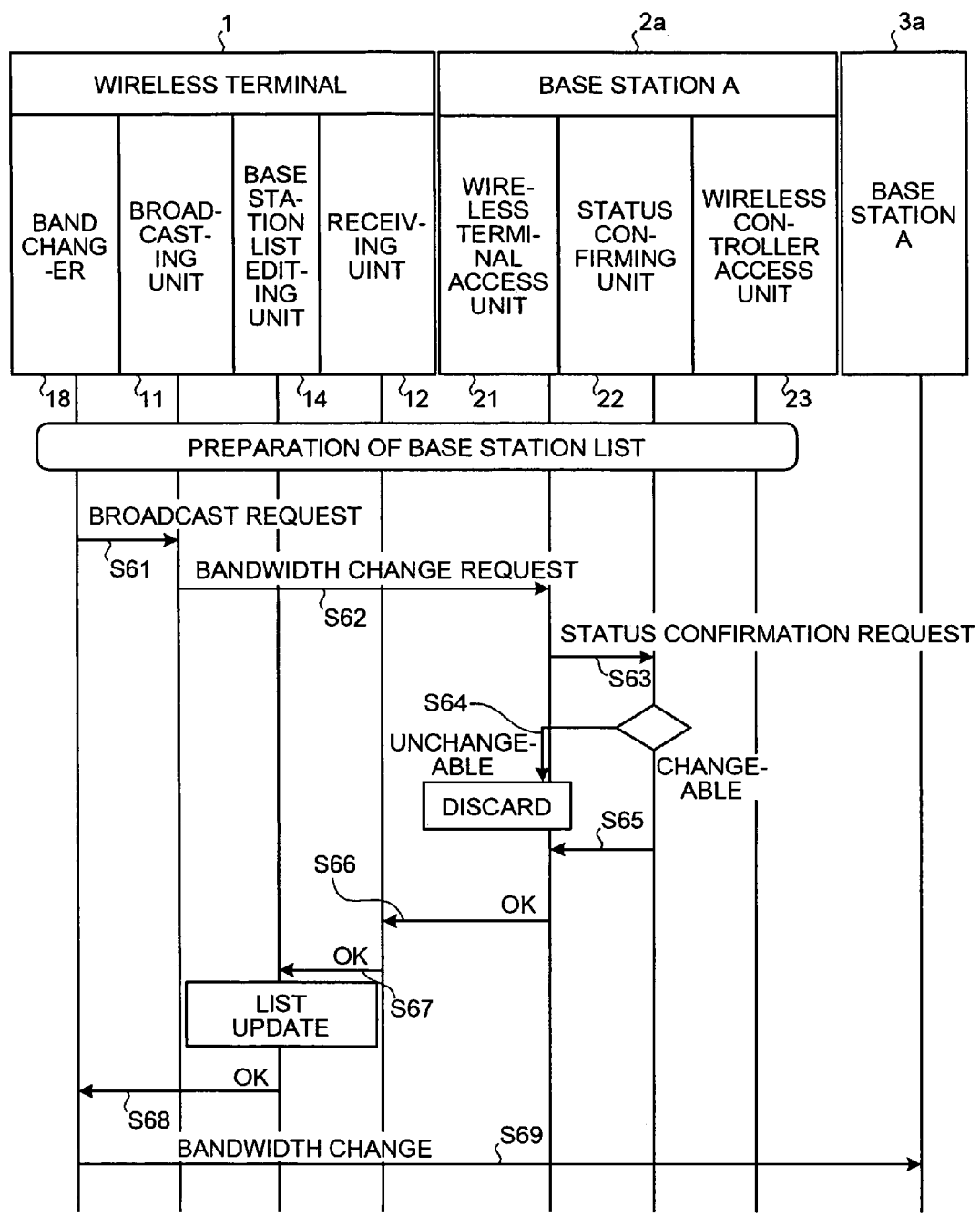
FIG. 14 is a timing chart of the bandwidth change according to the sixth embodiment.

FIG. 14 is a timing chart of the bandwidth change according to the sixth embodiment of the present invention. The bandwidth changer 18 of the wireless terminal 1 requests the broadcasting unit 11 to broadcast a bandwidth changeability confirmation request (Step S61). The broadcasting unit 11 refers to the base station list 15 and broadcasts the request to the base stations (Step S62).

The base station A2a/B2b/C2c receives the request by the wireless terminal access unit 21 that requests the status confirming unit 22 to confirm the status of the base station A2a/B2b/C2c (Step S63). The status confirming unit 22 judges whether the base station A2a/B2b/C2c can change the bandwidth in their subordinate cells, respectively. When the bandwidth is not changeable, the request to the base station A2a/B2b/C2c is discarded (Step S64). In the example shown in FIG. 13, the request to the base station B2b is discarded because it is in a congested state.

On the other hand, when the bandwidth is changeable, the status confirming unit 22 outputs an OK message to the wireless terminal access unit 21 (Step S65). The wireless terminal access unit 21 sends the OK message to the wireless terminal 1 (Step S66).

The wireless terminal 1 receives the OK message from the base station A2a/C2c by the receiving unit 12 that outputs the OK message to the base station list editing unit 14 (Step S67). The base station list editing unit 14 updates the bandwidth usage status information 154 of the base station A2a/C2c stored in the base station list 15 based on the OK message.

Along with updating of the base station list 15, the base station list editing unit 14 selects the base station A2a as a base station to change the bandwidth from the base station list 15. Then, the base station list editing unit 14 instructs the bandwidth changer 18 to change the bandwidth used in the communication with the base station A2a (Step S68). The bandwidth changer 18 changes the bandwidth used in the communication with the wireless controller A3a via the base station A2a (Step S69).

According to the sixth embodiment, the same effect as in the first embodiment is obtained. In addition, the bandwidth used for the wireless terminal 1 can be changed reliably.

Figure 15:
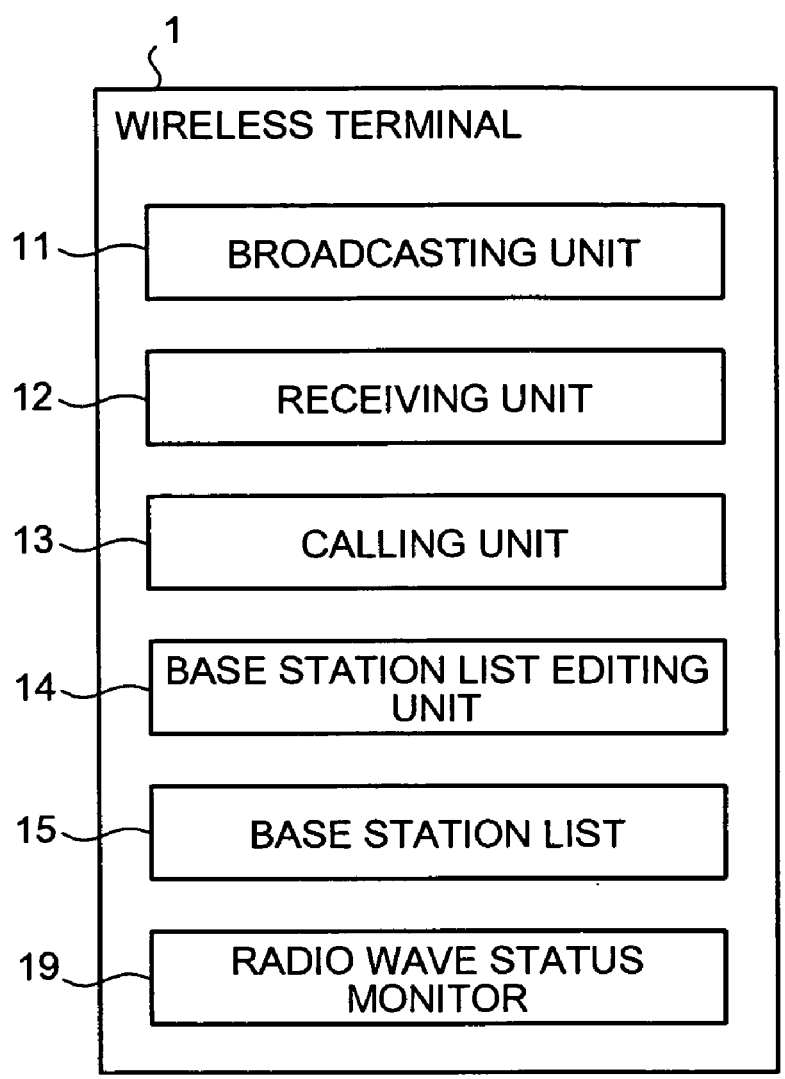
FIG. 15 is a block diagram of a wireless terminal in a wireless communication system according to a seventh embodiment of the present invention.

FIG. 15 is a block diagram of a wireless terminal in a wireless communication system according to a seventh embodiment of the present invention. The wireless terminal 1 according to the seventh embodiment 7 further includes a radio wave status monitor 19 for selecting optimal base station as a destination of handover. Specifically, the radio wave status monitor 19 monitors a radio wave status of a cell, and when detecting the communication quality getting lower, causes the wireless terminal 1 to be connected to another base station that can achieve better communication quality (in other words, the radio wave status monitor 19 switches the base station from one to another according th the radio wave status).

Figure 16:
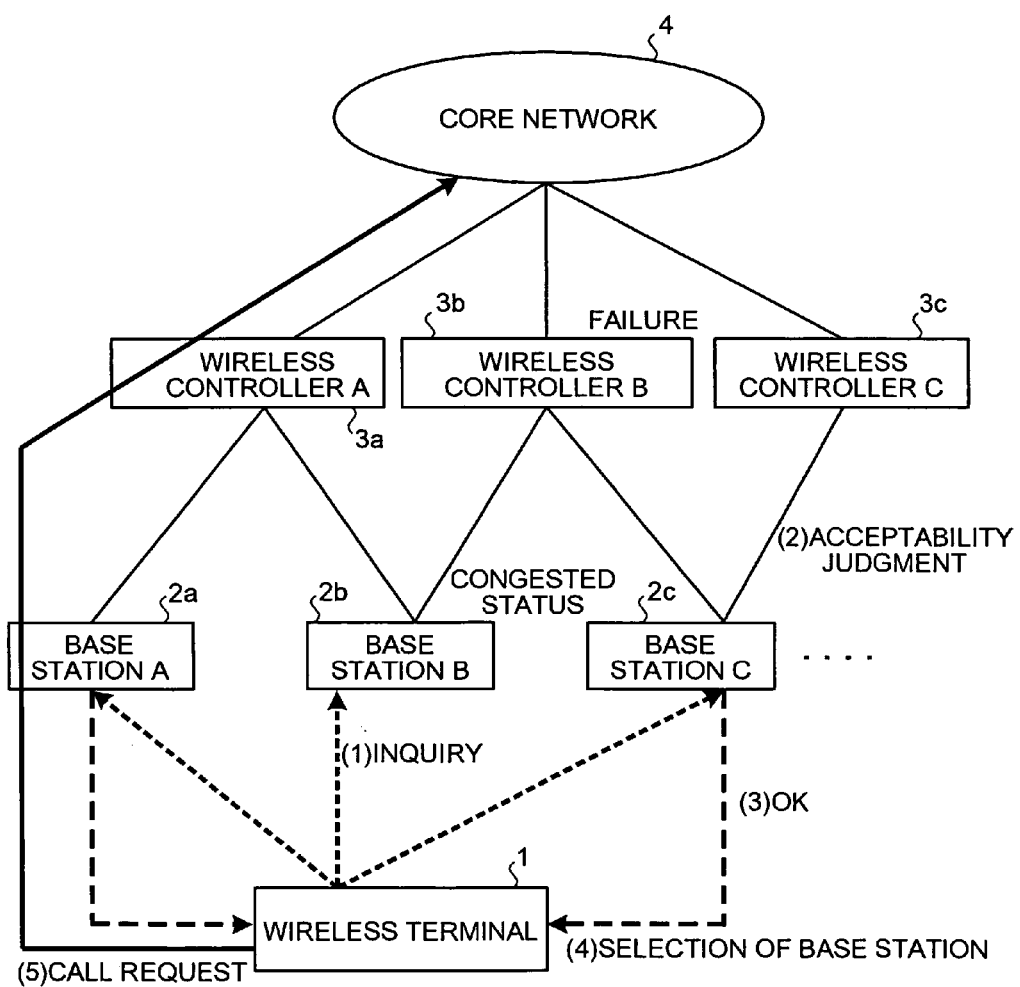
FIG. 16 is a diagram for explaining the outline of a base station selection according to the seventh embodiment.

FIG. 16 is a diagram for explaining the outline of a base station selection according to the seventh embodiment of the present invention. The wireless terminal 1 broadcasts the inquiry to all of the nearby base stations, that is, the base station A2a, the base station B2b, and the base station C2c ((1) of FIG. 16). The base station A2a/B2b/C2c judges whether its subordinate cell can accept a call request ((2) of FIG. 16).

In the seventh embodiment, it is assumed that the base station B2b cannot accept a call request because it is in a congested state. The base station A2a and the base station C2c, which can accept call requests, send OK messages to the wireless terminal 1, respectively ((3) of FIG. 16).

In the seventh embodiment, it is assumed that the wireless terminal 1 receives the OK message from the base station A2a earlier than that from the base station C2c. In this case, the wireless terminal 1 selects the base station A2a ((4) of FIG. 16), and transmits a call request to the base station A2a to switch the base station to which the wireless terminal 1 is connected ((5) of FIG. 16).

Figure 17:
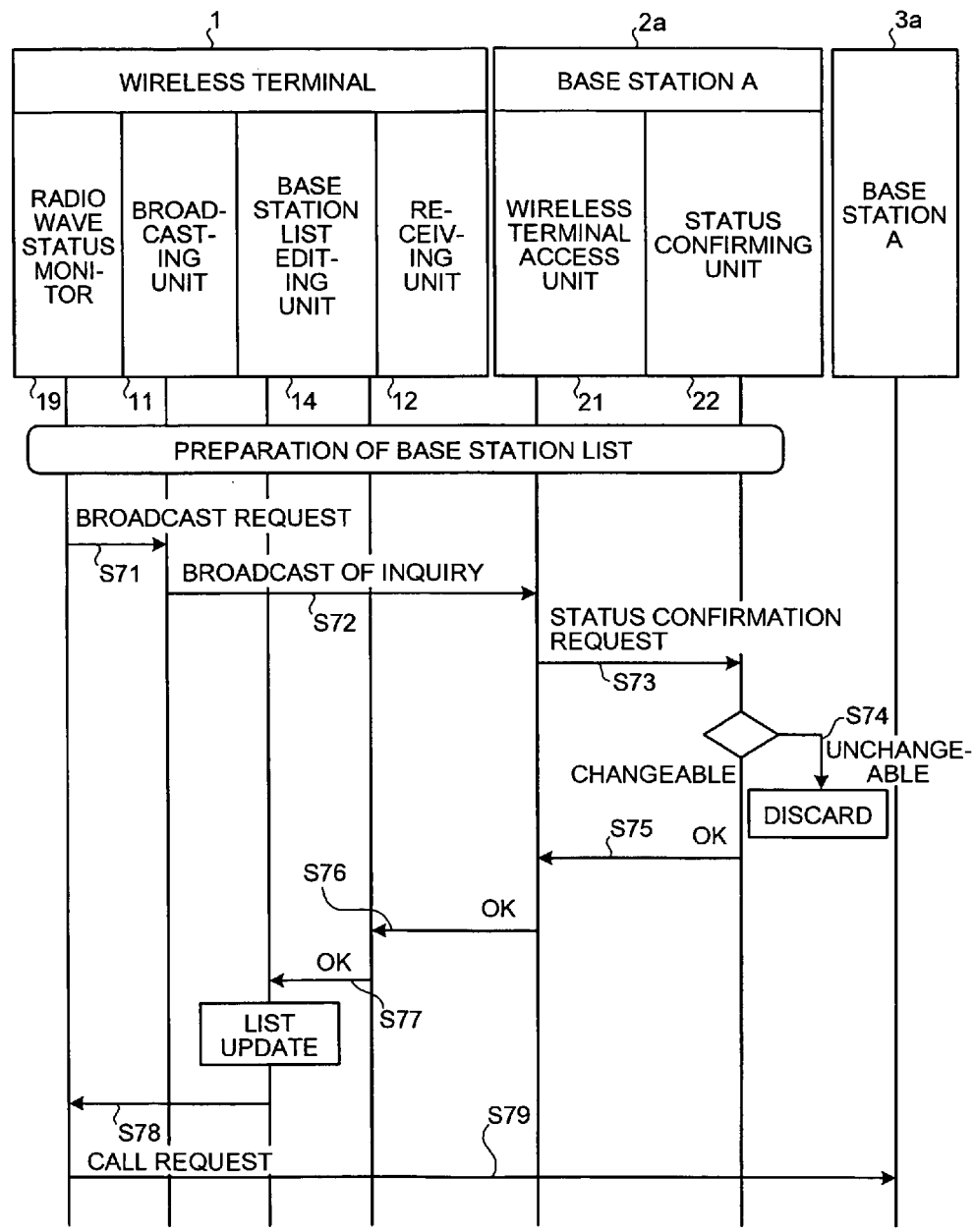
FIG. 17 is a timing chart of the base station selection according to the seventh embodiment.

FIG. 17 is a timing chart of the base station selection according to the seventh embodiment of the present invention.

The radio wave status monitor 19 of the wireless terminal 1 monitors a radio wave status of a cell during communications with the base station. When detecting a lowering in the communication quality, the radio wave status monitor 19 requests the broadcasting unit 11 to broadcast the inquiry to the base stations (Step S71).

The broadcasting unit 11 refers to the base station list 15 and broadcasts the inquiry to the nearby base stations (Step S72). The base station A2a/B2b/C2c receives the inquiry by the wireless terminal access unit 21 that requests the status confirming unit 22 to confirm the status of the base station A2a/B2b/C2c (Step S73). The status confirming unit 22 judges whether the base station A2a/B2b/C2c and its subordinate cell A5a/B5b/C5c can accpest a call request. When the base station A2a/B2b/C2c and/or the cell A5a/B5b/C5c cannot accept the call request, the inquiry to the base station A2a/B2b/C2c is discarded (Step S74). In the example of FIG. 16, the inquiry to the base station B2b is discarded because the base station B2b is in a congested state.

On the other hand, the status confirming unit 22 of the base station A2a/C2c outputs an OK message to the wireless terminal access unit 21 (Step S75). The wireless terminal access unit 21 of the base station A2a/C2c sends the OK message to the wireless terminal 1 (Step S76).

The wireless terminal 1 receives the OK message by the receiving unit 12 that requests the base station list editing unit 14 to update the radio wave status information 153 stored in the base station list 15. Along with updating of the base station list 15, the base station list editing unit 14 selects one of the base stations, for example, the base station A2a from the base station list 15, and notifies the radio wave status monitor 19 that the base station A2a is selected (Step S78). The radio wave status monitor 19 transmits a call request to the wireless controller A3a via the base station A2a notified from the base station list editing unit 14 (Step S79).

According to the seventh embodiment, the same effect as in the first embodiment is obtained. In addition, when the wireless terminal 1 moves during communications, it can switch the connection destination by selecting an optimal base station as a handover destination.

According to the present invention described above, an optimal base station is selected among a plurality of base stations in an area of the location of a wireless terminal, and a calling connection is made through an optimal path.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless terminal wirelessly connectable to plurality of base stations via a network and to a wireless controller, comprising:
a base station list that stores given information on the plurality of base stations;
a broadcasting unit that performs broadcasting to the plurality of base stations;
a base station list editing unit that edits the information stored in the base station list based on the information indicating whether each of the base stations can accept the call request from the wireless terminal;
a selecting unit that selects one base station that is fastest to respond among the base stations that can accept the call request based on the edited information;
a calling unit that transmits a call request to the base station selected by the selecting unit and establishes wireless connection with the selected base station;
a transmitting unit that transmits an inquiry to the selected base station; and
a receiving unit that receives a response to the inquiry from the selected base station, the response including the information to be stored in the base station list.

2. The wireless terminal according to claim 1, wherein the transmitting unit transmits the inquiry periodically, and the wireless terminal further includes an updating unit that updates the base station list based on the response.

* * * * *